PLUGBOARD ASSEMBLY

Original Filed Feb. 23, 1954 5 Sheets-Sheet 1

INVENTOR.
Gilbert C. Sitz

BY

Curtis, Morris & Safford

PLUGBOARD ASSEMBLY

Original Filed Feb. 23, 1954 5 Sheets-Sheet 2

INVENTOR.
Gilbert C. Sitz
BY
Curtis, Morris & Safford

PLUGBOARD ASSEMBLY

Original Filed Feb. 23, 1954 5 Sheets-Sheet 3

INVENTOR.
Gilbert C. Sitz
BY
Curtis, Morris & Safford

PLUGBOARD ASSEMBLY

Original Filed Feb. 23, 1954 5 Sheets-Sheet 4

INVENTOR.
Gilbert C. Sitz
BY
Curtis, Morris & Safford

PLUGBOARD ASSEMBLY

Original Filed Feb. 23, 1954 5 Sheets-Sheet 5

INVENTOR.
Gilbert C. Sitz
BY
Curtis, Morris & Safford

United States Patent Office

Re. 26,878
Reissued May 12, 1970

26,878
PLUGBOARD ASSEMBLY

Gilbert C. Sitz, Paxtonia, Pa., by AMP Incorporated, Harrisburg, Pa., a corporation of New Jersey, assignee Original No. 2,927,295, dated Mar. 1, 1960, Ser. No. 411,969, Feb. 23, 1954. Application for reissue May 7, 1969, Ser. No. 844,218
Int. Cl. H01r *13/26, 25/00*
U.S. Cl. 339—18 14 Claims

Matter enclosed in heavy brackets [ ] appears in the original patent but forms no part of this reissue specification; matter printed in italics indicates the additions made by reissue.

*ABSTRACT OF THE DISCLOSURE*

*A plugboard assembly wherein the contacts are first caused to wipe clean a path thereon during interconnection of the assembly and subsequently caused to engage at a pre-wiped intermediate point on said path.*

This invention generally relates to plugboard assemblies for electrical accounting machines, computers and the like, and in particular to the mechanism and contact assembly for effecting an operative interconnection between the movable plugboard and fixed plugboard of such assemblies.

It has become the prevailing practice to provide in electrical computing machines a fixed panel on which are arranged a set of electric contacts in rows and columns, certain of these contacts being connected to the sensing elements of the machine and the remainder providing terminals for the leads connected to the instrument panels that perform the operative functions of the machine. A control panel cooperates with the fixed panel to furnish circuit connections between the contacts associated with the sensing elements and in the instrumentalities desired to be operated according to some predetermined arrangement. Conventionally the control panel is adapted to be detached from the assembly for the purpose of interchanging such panels whenever a variation in the arrangement of circuit connections is desired, it being common practice to provide a preset control panel for each of the circuit arrangements periodically desired to be set into the machine whereby a particular group of computations may be similarly handled in accordance with certain standard reports to be rendered by the machine.

Generally the control panel is provided with a set of contacts conventionally in the form of removable plugs whereby any preset control arrangement or modification thereof may be made.

When it is desired to print a common form, the control panel is preset in an arrangement corresponding to the common form and it is inserted in a carrier frame in the plugboard assembly, the control panel in its frame constituting the movable plugboard thereof. The carrier frame and control panel are then positioned with respect to the fixed panel whereby the sets of contacts effect the circuit connections in the desired arrangement.

The mechanisms of the prior art for interconnecting the plugboards have, in general, taken two forms, the first of which simply comprises a lever which is coupled to and swings the carrier frame about a pivot on the base of the fixed plugboard. It has been recognized, however, that interconnection of the assembly solely by pivotal motion may result in warping of the control panel due to the uneven contact pressure distribution arising from engagement of the contacts nearest the pivot connection prior to those more removed. This defect led to the development of a second form of plugboard in which the mechanism is first operative to position the plugboards mutually parallel with the contacts being in an overlapping spaced relationship, and further operative to cause the movable plugboard to slide with respect to the fixed plugboard whereby the contacts may simultaneously be brought into engagement resulting in an even pressure distribution.

In addition to bringing the plugboards into operating relationship the control mechanism must include elements adapted to cooperate with the remainder of the assembly to perform certain other functions to achieve optimum results. For example, means for cleaning the contact surfaces must be provided to assure good electrical conductivity therebetween. Further, means for maintaining the assembly against accidental displacement from the interconnected position must also be provided. Space limitations, however, dictate that these objectives be achieved by a mechanism of a simple and compact construction. The plugboard assemblies of the prior art, however, include complicated mechanisms which are bulky, difficult to assemble, and expensive to maintain. Moreover, the methods heretofore proposed to cleanse the contact surfaces are inadequate, such methods usually involving a relative wiping of the contacts over a limited path during interconnection of the assembly. This wiping action, however, has not been entirely effective since the ultimate point of contact between the elements is at the end of the wiping path which is also the point where the accumulated foreign matter is deposited.

Accordingly it is an object of the present invention to provide an improved coupling mechanism for plugboard assemblies.

Another object of the present invention is to provide a coupling mechanism for plugboard assemblies which is compact, durable and simple to assemble and maintain.

A further object is to provide an improved locking arrangement for the coupling mechanism of plugboard assemblies.

A still further object of the invention is to provide a plugboard assembly wherein the contacts are first caused to wipe clean a path thereon during interconnection of the assembly then caused to engage at a prewiped intermediate point on said path.

An additional objective resides in the provision of a commercially feasible organization of parts which overcomes certain disadvantages inherent in the structures of the prior art.

These objects are generally attained by the provision of a coupling mechanism for plugboard assemblies in the general form of a sliding block linkage which is further characterized in that the linkage is stopped in an overcenter position when the assembly is interconnected. Means are provided to render ineffective the sliding block action of the linkage until the movable plugboard is brought to a position parallel to the fixed plugboard with the respective contacts being in an overlapping spaced relationship. The linkage mechanism is then operative during movement to dead center to lift the movable plugboard, similarly to a sliding block, thereby causing a set of contact plugs on the movable board to engage and wipe a cooperating set of spring contacts on the fixed plugboard. Movement of the linkage mechanism overcenter completes the interconnecting of the assembly and results in a slight dropping of the movable plugboard which partially withdraws the plug contacts along the path of wiping action for insuring final contact engagement at a point of good electrical conductivity. In addition the tension of the spring contacts acting through the plug contacts and movable plugboard biases the linkage mechanism overcenter which maintains the assembly interconnected.

Other objects and attainments of the present invention will become apparent to those skilled in the art upon reading the following detailed description when taken in conjunction with the drawings.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

In the drawings Figure 1 is a perspective view of the plugboard assembly with certain parts being broken away for the purpose of clarity;

Figure 8:
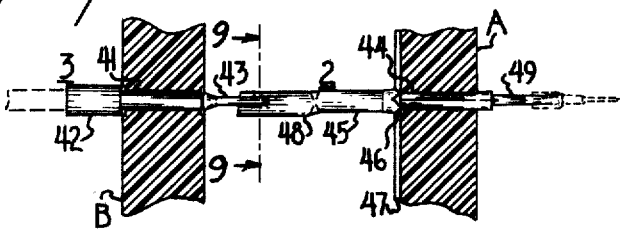
Figure 2:
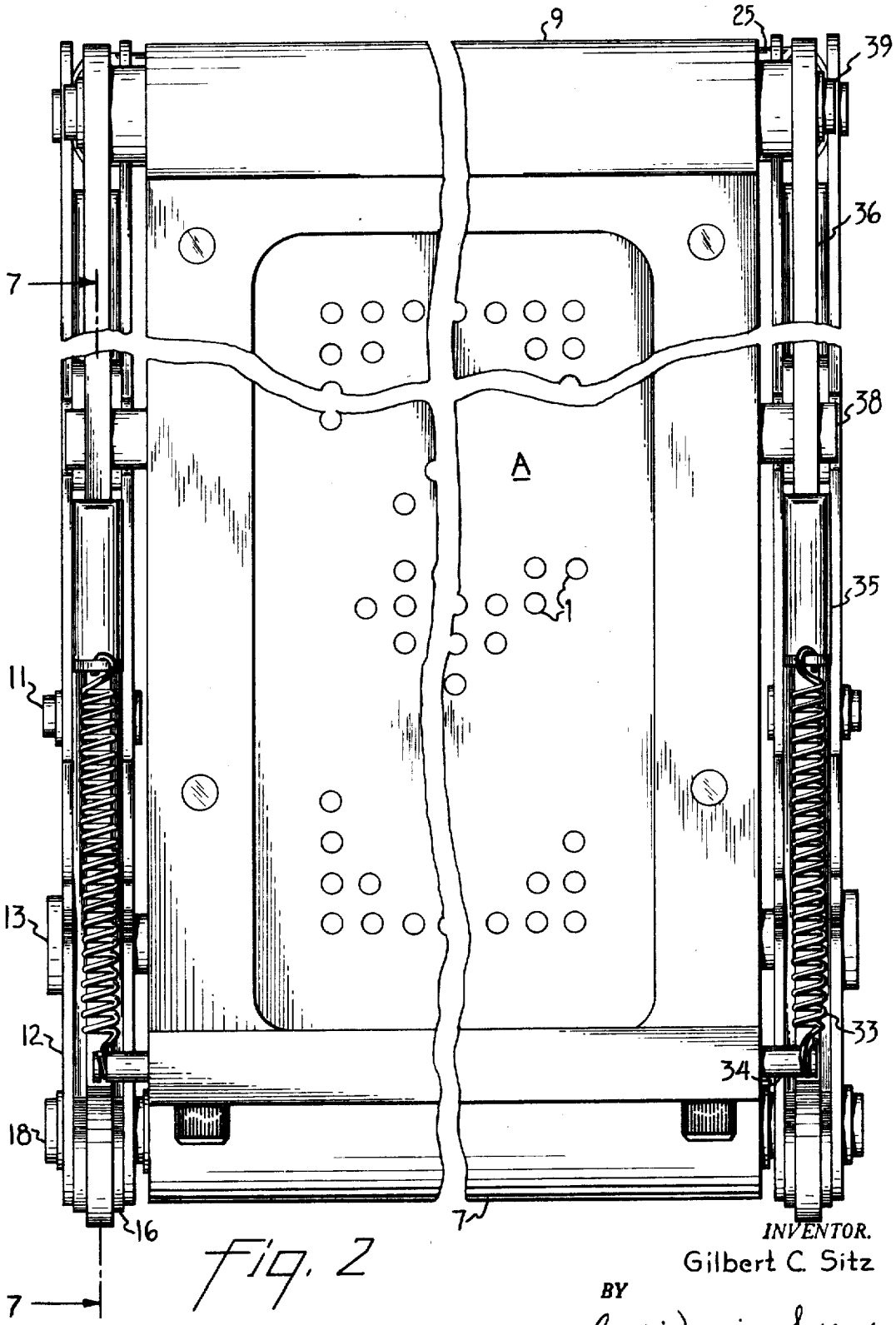
Figure 2 is an elevational view from the rear side of the plugboard assembly.
Figure 3:
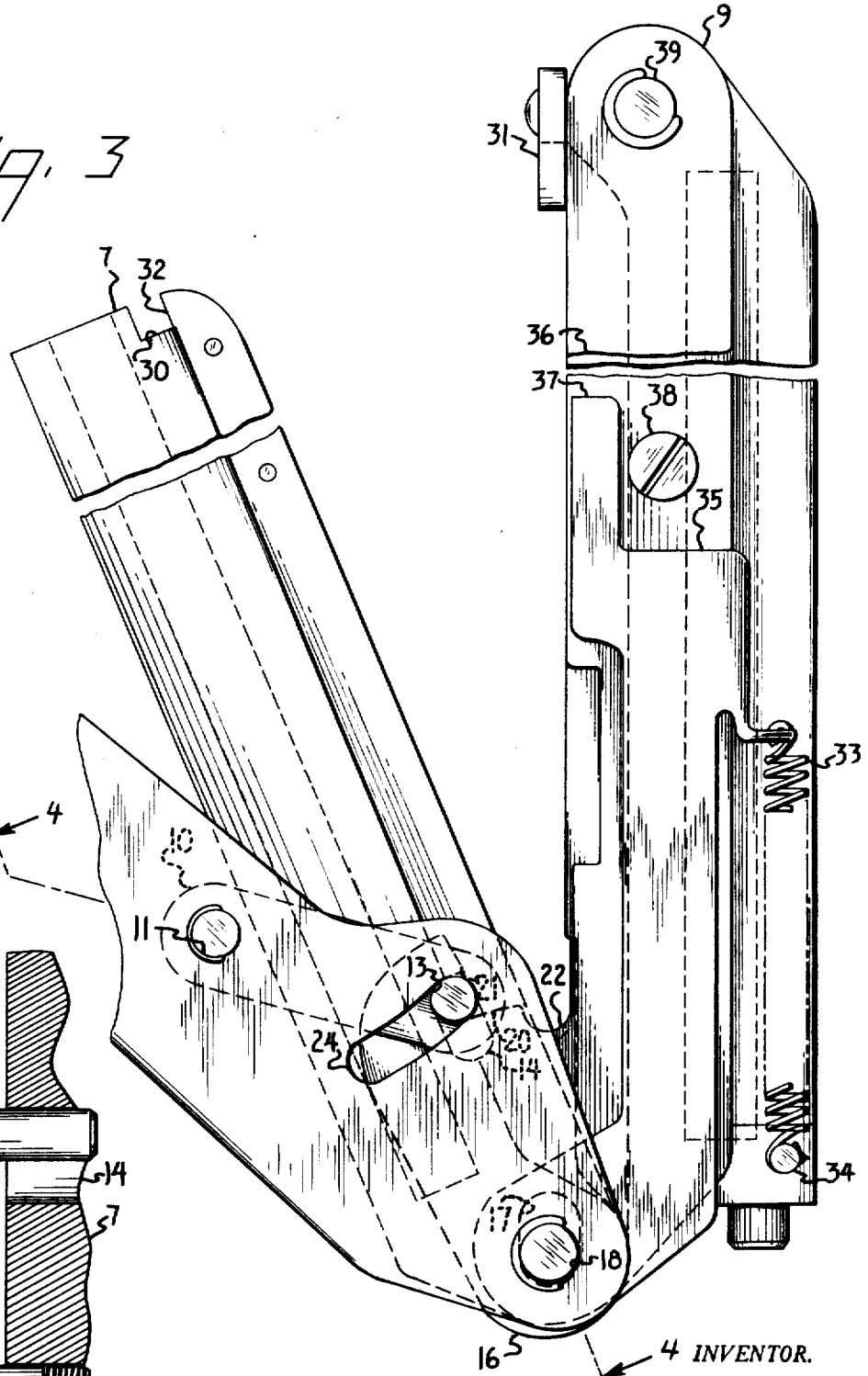
Figure 3 is a side view of the plugboard assembly in the open position.
Figures 7A, 7B, 7C:
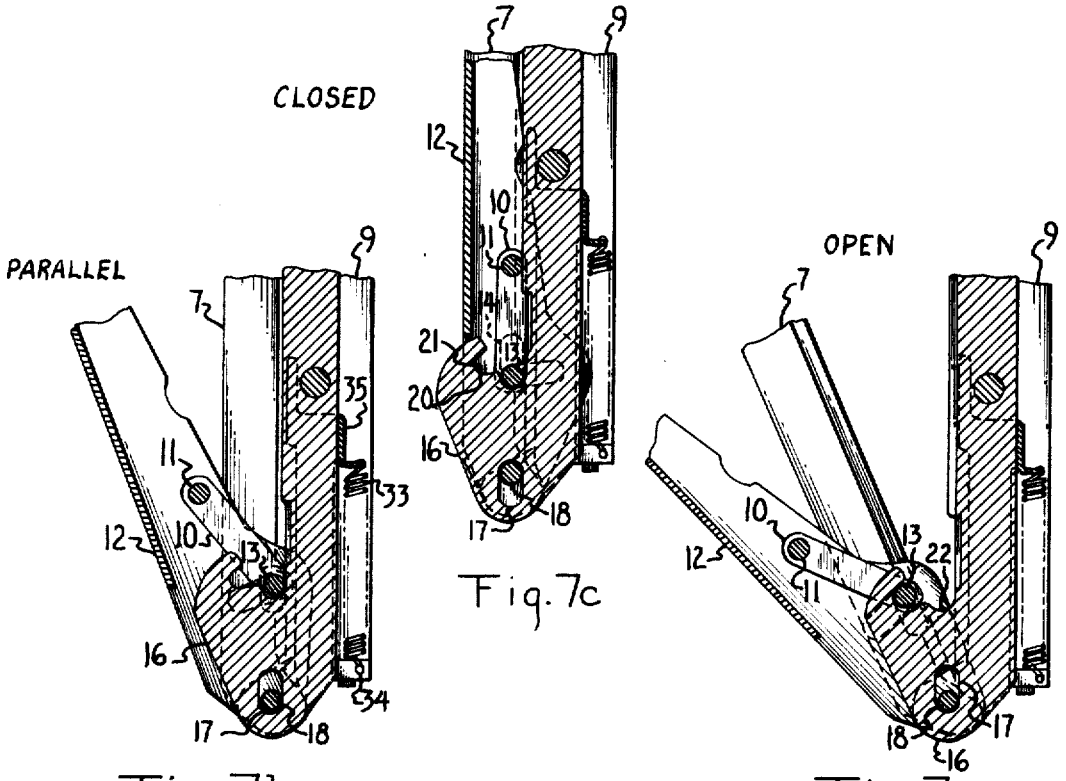

Figures 7a, 7b, and 7c are side views of the plugboard mechanism in successive stages of operation taken at 7, 7 of Figure 2;

Figure 8 is a side view of the contact assembly when engaged; and

Figures 9A, 9B, 9C:
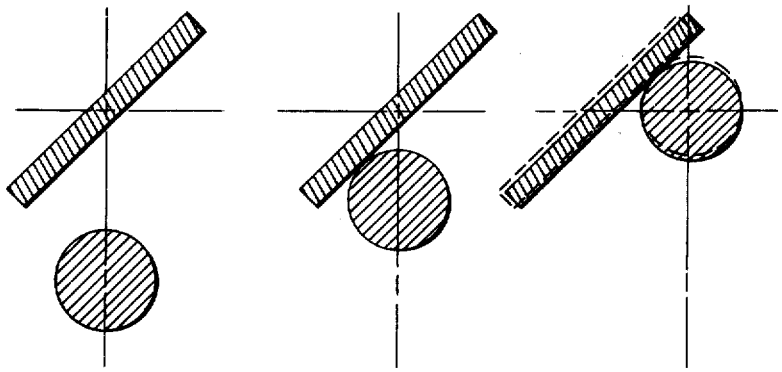

Figures 9a, 9b and 9c are views taken at 9, 9 of Figure 8 for illustrating the relationships of the contacts during several stages in the inconnection of the plugboard assembly.

Figure 1:
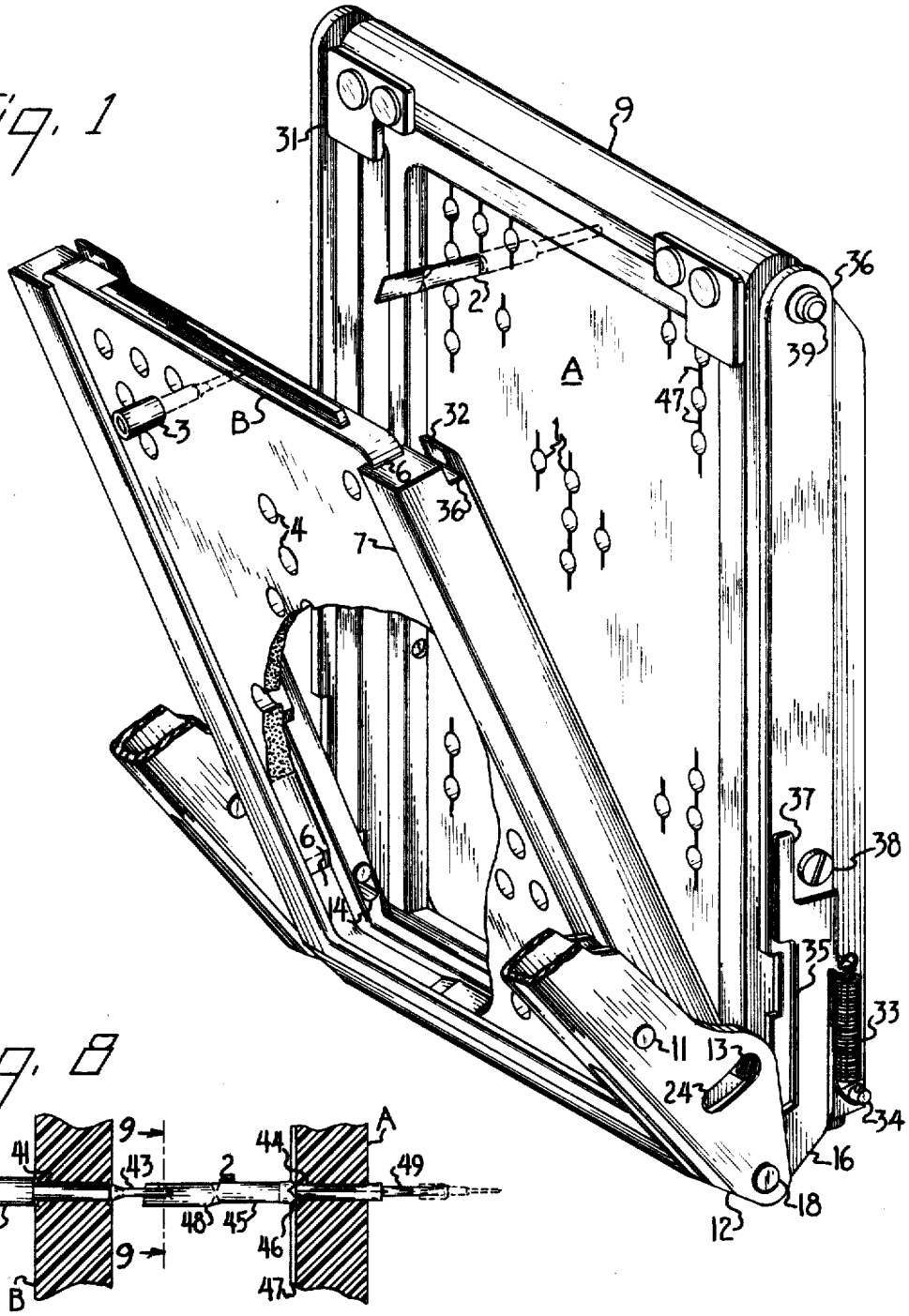

Referring now to the drawings a fixed plugboard panel of any suitable electrical insulating material and generally designated at A in Figure 1 is provided with rows and columns of apertures 1 which are adapted to receive therein a set of spring contact members 2. As best shown in Figure 8, contact members 2 are the terminals for the leads which electrically couple the fixed panel to the sensing elements and the operative instrumentalities of the computing machine or the like, not shown. Contact members 2 may take any suitable form, but it is preferred that these contacts have the characteristics as disclosed in the copending application to William S. Watts, Serial No. 409,603, filed February 11, 1954, now Patent No. 2,882,508, for reasons to become more apparent hereinafter. Cooperating with contact members 2 to effect the desired circuit interconnections within the accounting machine is a set of plug contact members 3 that are adapted to be received by a plurality of apertures 4, corresponding to apertures 1, in control plugboard panel B which also is of suitable insulating material.

To permit the control panel to be detached from the plugboard assembly, panel B is slideably mounted in channels 6 of a rotatable carrier frame 7 loosely pivotally mounted at the base of a fixed frame 9 in which plugboard panel A is mounted and by which the plugboard assembly is supported on the computing machine. Pivotal movement of carrier frame 7 carries control panel B to a position parallel to fixed panel B, subsequent rectilinear motion thereof along the fixed plugboard being effective to cause engagement of the sets of contacts in a manner to be hereinafter described.

With reference to Figures 3 to 7, the linkage mechanism which is operative to control the movement of the carrier frame 7 generally includes a crank arm 10 pivotally connected at one end by pin 11 to a connecting link 12 and at the other end carries a pivot pin 13 that is coupled to carrier frame 7 by projecting into longitudinal slot 14 intermediate the length thereof. Fixed frame 9 has at the base thereof an outwardly extending projection 16 that is provided with an upwardly extending slot 17 through which pivot pin 18, fixed at the base of carrier frame 7, projects thereby to serve as a loose pivotal coupling between the plugboards. Connecting link 12 is also pivotally coupled to carrier frame 7 and loosely coupled to fixed frame 9 by pivot pin 18, and is extended beyond pin 11 to provide an operating lever for the coupling mechanism.

Projection 16 additionally includes a guide track 20, the surface of which is on a segment of a circle about the pivotal point of connecting link 12 at pin 18, for guiding the movement of pin 13 between a stop 21 at one end of track 20, corresponding to the open position (Figure 3) of the assembly, and a recess 22 of a depth of approximately one-half the diameter of pin 13 at the other end of track 20, corresponding to the closed position (Figure 5) of the assembly as will be described.

Figure 4:
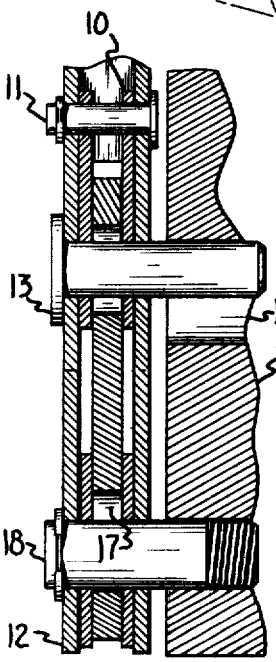
Figure 4 is a view of the linkage mechanism taken at 4, 4 of Figure 3.
Figure 5:
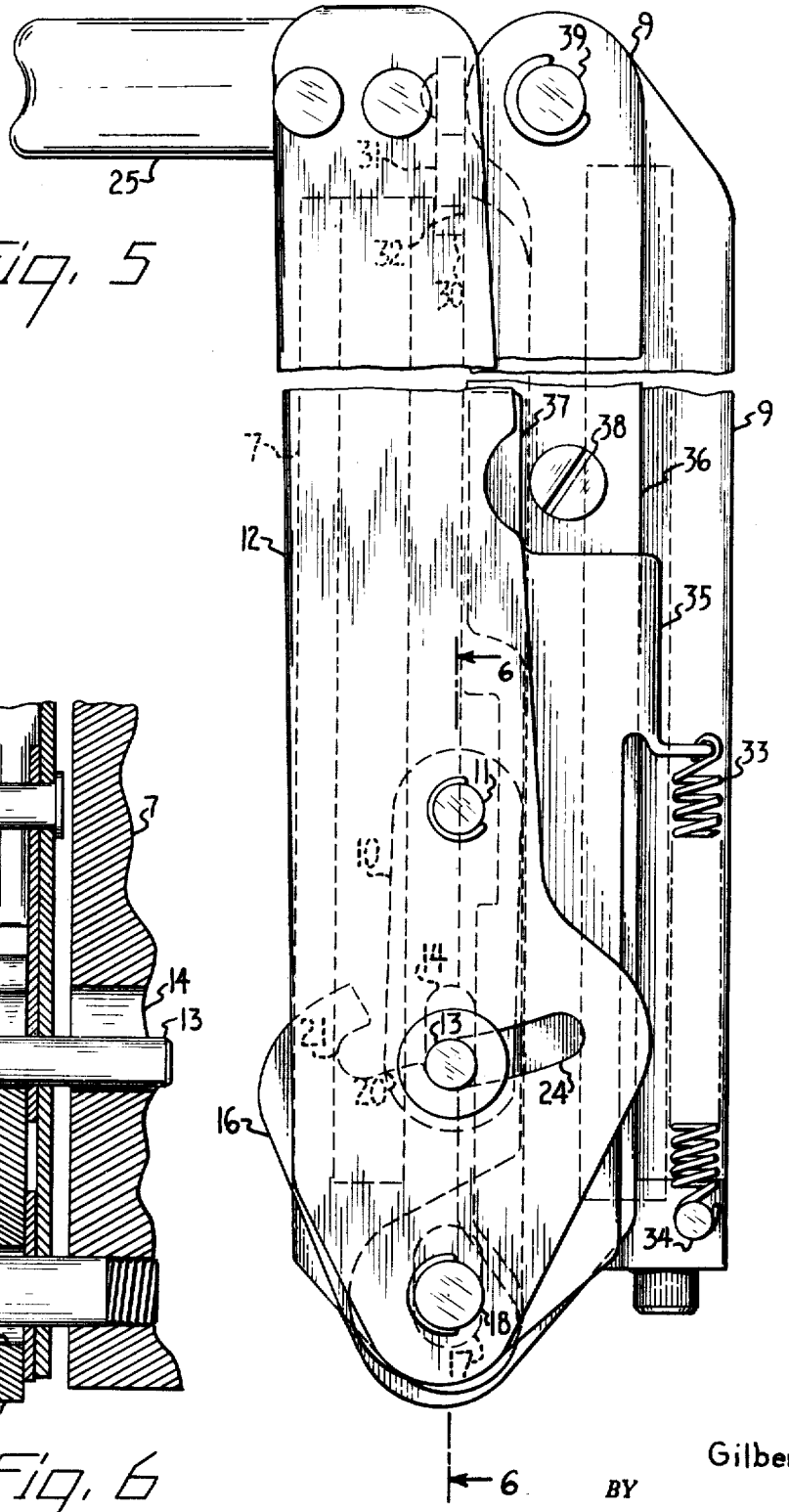
Figure 5 is a side view in elevation of the plugboard assembly in the interconnected position.
Figure 6:
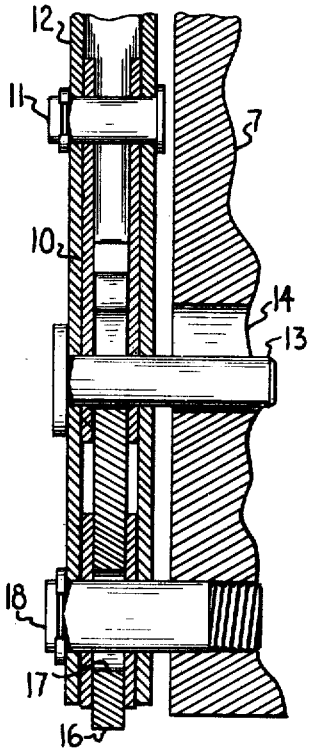
Figure 6 is a view of the linkage mechanism taken at 6, 6 of Figure 5.

It will be observed from Figure 1 and Figure 2 that the linkage mechanism is duplicated on each side of frame 9 which serves to distribute evenly the loading of the assembly and adds stability and strength. Additional stability and strength may be imparted to the linkage mechanism by utilizing double elements for each link as shown in Figure 4 and Figure 6. In this connection to facilitate installation of pin 13 in the linkage, this pin is fitted through link 12. Slot 24 allows link 12 to continue rotation after pin 13 is seated in recess 22.

To provide an operating handle for the assembly, the outer ends of the extensions of links 12 are connected by bar 25.

As thus connected, the linkage mechanism acts substantially in the nature of a sliding block mechanism, carrier frame 7 and control panel B being similar to the block which in operation slides along fixed frame 9, but with a floating pivot for crank arm 10 whereby carrier frame 7 may be pivoted so as to move control panel B to a readily accessible position. In operation, in the open position of the assembly, stop 21 defines the limit of counterclockwise rotation (Figure 3 and Figure 7a), of carrier frame 7 and link 12 away from the face of fixed panel A through engagement with pin 13 to which both frame 7 and link 12 are connected. It will be observed that in this position pin 13 is maintained by track 20 near the top of the slot 14 while pivot pin 18 rests on the bottom of slot 17. As handle 25 is moved toward fixed frame 9, lever arm 12 is caused to pivot about pin 18 and through crank arm 10, pin 13 is moved along track 20 to a position over recess 22, the coupling afforded by pin 13 between crank arm 10 and carrier frame 7 also causing the movable plugboard to pivot about pin 17 toward the fixed plugboard. Recess 22 is so placed along track 20 such that upon pin 13 arriving thereover the movable plugboard assumes a position parallel and adjacent to the fixed plugboard (Figure 7b). In this position of the plugboards the plug contacts are parallel to and spaced a predetermined distance from the respective spring contact members 2 as illustrated diagrammatically in Figure 9a. Further movement of handle 25 and link 12 toward the fixed plugboard results in pin 13 dropping in slot 14 thereby to seat in recess 22 and to provide a pivotal point about which crank arm 10 may rotate. As crank arm 10 is rotated about pin 12 in recess 22, through further movement of handle 25, the linkage mechanism, by sliding block action, causes pin 18 to rise in slot 17 which advances the movable plugboard upwardly along the fixed plugboard whereby to engage the sets of contacts, as will be explained, until the center of pin 11 reaches the line of centers of pin 18 and pin 13, the dead center position of the mechanism. Before link 12 abuts fixed frame 9 to stop rotation of crank arm 10, however, pin 13 is moved slightly past the line of centers, or overcenter (Figure 5), resulting in a slight dropping of the movable plugboard relative to the fixed plugboard. Accordingly to open the plugboard assembly, the movable plugboard together with the plug contacts thereon must again be lifted against the tension of the spring contacts on the fixed plugboard, such tension effecting a bias action which tends to maintain the linkage overcenter and the assembly interconnected.

The relationships of the elements of the linkage mechanism during interconnection of the assembly is best illustrated in FIGURE 7 wherein FIGURE 7a illustrates the linkage mechanism in the open position with pin 13 abutting stop 21 and pin 18 at the bottom of the recess 17, FIGURE 7b the position of the elements when the carrier frame is parallel to the fixed plugboard prior to initiation of the lifting action with pin 13 moving into recess 22 and pin 18 remaining at the bottom of slot 17, and FIGURE 7c the linkage in the closed overcenter position with pin 13 being seated in recess 22 and pin 18 being raised to the top of slot 17.

A recess 30 in the top edge of carrier frame 7, cooperating with an overhanging plate 31 mounted on the top inner corner of fixed frame 9, serves to insure that the movable plug board is properly spaced from the fixed plugboard during interconnection of the assembly whereby to obtain optimum engagement of the contacts. Should carrier frame 7 not be pivoted far enough toward fixed frame 9, then during the lifting action, lip 32 of recess 30 will abut the edge of plate 31 whereby the lifting movement may be stopped before the contacts are caused to engage. In addition plate 31, when projecting into recess 30, assists in maintaining interconnection of the assembly.

When the movable plug board is shifted from the closed to the open position, handle 25 is moved as to rotate link 12 in a counterclock direction, the movable plugboard dropping under its own weight whereby plate 31 disengages with recess 30. Further rotation of link 12 causes, through crank arm 10, positive pivotal movement of carrier frame 7 away from fixed frame 9 whereupon pin 13 rises out of recess 22 and moves along track 20 until stopped by stop 21. To insure, however, that the initial dropping action occurs regardless of assembly position, the movable plugboard may be positively biased toward the down position with pin 18 at the bottom of slot 17. For example, biasing spring 33, connected at one end to stud 34 on frame 9 and at the other end to member 35 which is coupled to carrier frame 7 by connection with pin 18, may be provided to urge the movable plugboard to the down position, member 35 being U-shaped and slidably mounted on the side of fixed frame 9 by means of rail 36 and prevented from rotation about pin 18 by an integral finger 37 extending along rail 36 over the head of bolt 38 by which, together with bolt 39, rail 36 is attached to frame 9.

Referring now to FIGURES 8 and 9, which illustrate one form the contact assembly may take, plug contact 3 is seen to include a barrel portion 41 which is detachably maintained within apertures 4 by any suitable means known in the art, for example, a friction grip between barrel 41 and the sidewalls of aperture 4 will suffice. Integrally connected at opposed end of barrel 41 are ferrule 42 and plug pin 43, ferrule 42 providing the means by which the plugs are connected to the electrical connecting leads therebetween and plug pin 43 constituting the electrical contact portion of the plug.

Spring contact members 2, preferably of the form disclosed in the aforesaid copending application of W. S. Watts, comprise a barrel portion 44 which is adapted to be received in apertures 1 of fixed panel A, the barrel being of sufficient length so as to project from the rear side of panel A whereby the contact member may be anchored at one end by deforming the barrel. Leaf spring portion 45, integral with barrel portion 44, has shoulders 46 thereon which are adapted to be received in longitudinal grooves 47 that intersect apertures 1 on the face of the fixed panel and serve to maintain the plane of the leaf spring parallel to the length of the fixed panel and to the direction of movement of pin 43. Shoulders 46 additionally cooperate with the deformed end of barrel 44 to fasten securely contact member 2 to fixed panel A. A tab portion 48, integral with the leaf spring portion 45 and set at an angle of substantially 45° relative to the length and plane thereof, serves as the contact surface for member 2. Provided at the rear end of barrel portion 44 is an integral tapered tab portion 49 which is adapted to cooperate with tapered socket terminal on the lead from within the computing machine whereby the plugboard assembly and the electrical circuitry of the computing machine may be coupled.

Upon operation of the linkage mechanism, as the movable plugboard is advanced through the various stages described above, the contact elements of the contact assembly assume the positions diagrammatically illustrated in cross-section in FIGURE 9. Specifically, when the movable plugboard is positioned parallel to the fixed plugboard and prior to initiation of lifting action, the respective contact elements are in a parallel spaced relationship (FIGURE 9a). As the movable plugboard travels upwardly along the fixed plugboard, pin contact 43 is advanced toward and into initial engagement with tab contact 48 at the forward part of the inclined face thereof (FIGURE 9b), further movement of the movable plugboard causing pin contact 43 to flex leaf spring 45 while wiping contact tab 48 which is thus rendered free of foreign matter, such as dust, dirt, corrosion, etc., along the path of wiping engagement. It is to be noted since the plane of leaf spring portion 45 is restrained parallel to the direction of pin movement, the flection thereof will be in a direction perpendicular to pin movement with the result that the path of engagement of pin contact 43 and the inclined face of tab 48 will constitute the hypotenuse of a right triangle, hence, the movement of pin 43 is amplified as translated into wiping action whereby to improve the electrical contact between the elements. The limit of the path of wiping action, shown in dotted lines in FIGURE 9c, is determined by the linkage mechanism reaching dead center, the slight overcenter movement of the linkage mechanism described above being effective to retract pin contact 43 along the wiped path on tab contact 48 (FIGURE 9c—solid lines) as the movable plugboard is dropped into its final position relative to the fixed plugboard. In the retracted position pin 43 engages tab 48 at a pre-wiped point whereby good electrical contact is had.

The extent to which pin contact 43 may be retracted along the pre-wiped path on tab 48 is determined by the degree of overcenter movement of the linkage mechanism, and while it is desirable that the pin be withdrawn away from the foreign matter accumulated at the end of the wiped path, it is equally important to the maintenance of good electrical contact between the elements that the contact pressure due to the flexure of leaf spring 45 should not be unduly diminished by such withdrawal. In the preferred form of my invention the overcenter rotation of crank arm 10, being restricted to a few degrees, limits the retraction of contact pin 43 to a few thousandths of an inch whereby contact pressures of the order of 6 to 8 ounces may be had while utilizing spring materials of ordinary stiffness and elasticity.

In the ordinary use of the plugboard assembly, to handle a given set of record cards it may not be necessary to insert a plug contact in each of apertures 4. As the number of plug contacts required is increased, however, the average force needed to lift the movable plugboard against the tension of the spring contacts likewise increases, which may involve forces of the order of several hundred pounds. It is to be observed that with the linkage mechanism of the present invention a high average mechanical advantage is available, the instantaneous mechanical advantage increasing as the movable plugboard travels upwardly and approaching a theroetcial infinite value at the dead center position of the mechanism which corresponds to the point where the spring contacts are under the greatest tension. In this connection it is desirable that the plugboard assembly be light in weight while yet being sufficiently sturdy to withstand the stresses involved. An analysis of the assembly will show that the greatest stresses are set up at pin 18, projection 16 and along the length of fixed frame 9. Accordingly, in the preferred embodiment projection 16 and rail 36 are integrally connected and made of a material of high strength such as steel, rail 36 thereby constituting a reinforcing member which carries the greater part of the loading along the fixed frame. Thus, the fixed frame may be cast of a light-weight lower strength material such as aluminum thereby reducing the overall weight of the assembly.

In the arrangements illustrated it will be observed that each of the contact tabs are similarly inclined which gives rise to a lateral stress acting against the sides of carrier frame 7. Where the number of contacts is increased to the point that this lateral stress becomes greater than that which the carrier frame can conveniently be designed to withstand, this lateral stress may be balanced out for example, by reversing the inclination of one-half of the contact tabs.

While in the foregoing specification and drawings I have shown and described a preferred embodiment of my invention, it will be recognized by those skilled in the art that many modifications may be made without departing from the spirit of the invention. No limitation upon the scope of the claims is intended except insofar as required by the prior art.

I claim:

1. In an interconnecting plugboard assembly for computing machines, a fixed plugboard having a first set of contacts, a movable plugboard loosely pivoted on said fixed plugboard and having a second set of contacts adapted to engage said first set upon interconnection of said assembly, a connecting link having one end thereof pivotally coupled to said movable plugboard and being extended to form an operating lever, a crank arm having one end pivotally connected to said link, a pivot pin on the other end of said arm and loosely coupled to said movable plugboard, guide means on said fixed plugboard defining a limited path of rotation for said pivot pin about the pivot end of said link and providing for said crank arm a fixed pivotal point, said lever upon initial movement causing said pivot pin to move to said pivotal point and being effective through said arm to position said movable plugboard parallel to said fixed plugboard with said contacts being in an overlapping spaced relationship, said crank arm upon rotation thereof about said pivot point by further movement of said lever being effective through said link to move said movable plugboard along said fixed plugboard to bring said first and second sets of contacts into engagement.

2. In an interconnecting plugboard assembly for computing machines, a fixed plugboard having a first set of contacts, a movable plugboard having a second set of contacts adapted to engage said first set upon interconnection of said assembly, a carrier frame for said movable plugboard loosely pivoted on said fixed plugboard, a connecting link having one end thereof pivotally connected to said frame and being extended to form an operating lever, a crank arm having one end pivotally connected to said link, a pivot pin on the other end of said arm and loosely connected to said frame, guide means on said fixed plugboard defining a limited path of rotation for said pivot pin about the pivotal end of said link, said guide means having a recess to provide for said crank arm a fixed pivotal point, said lever upon initial movement causing said pivot pin to move into said recess and being effective through said arm to positon said movable plugboard parallel to said fixed plugboard with said contacts being in an overlapping spaced relationship, said crank arm upon rotation thereof about said pivotal point by further movement of said lever being effective through said link to move said frame along said fixed plugboard to bring said sets of contacts into engagement.

3. In an interconnecting plugboard assembly, a fixed plugboard having a set of spring contacts, a movable plugboard having a set of plug contacts adapted to engage and flex respectively said spring contacts, a contact surface on each of said spring contacts, a carrier frame for said movable plugboard and loosely pivoted on said fixed plugboard, an overcenter linkage mechanism for interconnecting said plugboards including a connecting link having one end thereof pivotally connected to said frame and being extended to form an operating lever, a crank arm having one end pivotally connected to said link, a pivot pin on the other end of said arm and loosely connected to said frame, guide means on said fixed plugboard defining a limited path of rotation for said pivot pin about the pivotal end of said link, said guide means having a recess to provide a fixed pivotal point for said arm, said lever upon initial movement causing said pivot pin to move into said recess and being effective through said arm to position said movable plugboard parallel to said fixed plugboard with said contacts being in an overlapping spaced relationship, said crank arm upon rotation thereof about said pivotal point by further movement of said lever being effective to move said mechanism to dead center and through said link to move said frame along said fixed plugboard for causing said plug contacts to engage and wipe said spring contacts along paths on said surfaces, said crank arm upon further rotation thereof being effective to move said mechanism slightly overcenter for partially withdrawing said plugs back along said paths, said spring contacts being effective through said movable plugboard and said link to bias said mechanism overcenter when said plugboards are interconnected.

4. In an interconnecting plugboard assembly; a fixed plugboard having a first set of contacts; a movable plugboard having a second set of contacts engageable with said first set upon interconnection of said assembly; said movable plugboard being disposed parallel to, and mounted in said assembly for sliding movement along, and having a loose pivotal connection with said fixed plugboard with the contact sets being in aligned but spaced relation; a linkage mechanism for interconnecting said plugboards including a crank link having one end disposed at bearing means on said fixed plugboard providing a pivot point about which the crank link is rotatable; a connecting link pivotally connected to said crank link and pivotally connected at its driving end to said movable plugboard; means defining for one of said ends a limited path of rotation about the point of pivotal connection of said plugboards; said one end being connected to said movable plugboard for moving the movable plugboard therewith upon rotation along said path; and lever means rigidly connected to one of said links and rotatable in one direction to rotate said crank link thereby to cause said movable plugboard to slide along said fixed plugboard for engaging said contact sets, and rotatable in the reverse direction to move said one end along said path for pivoting said movable plugboard.

5. In an interconnecting panel assembly, fixed panel means carrying a first set of contacts each having a contact path, movable panel means carrying a second set of contacts each having a contact element slidably engageable with a contact path, said movable panel means being mounted in said assembly for reciprocating movement relative to said fixed panel means, operating means coupled to said panels for interconnecting the same, said operating means including rotary-to-reciprocating motion transmitting means having a rotatable member operatively coupled to said movable panel means, said member being rotatable in one direction to reciprocate said movable panel means to move each contact element of said second set first toward and into sliding and wiping engagement with the respective contact path of said first set and then to retract said contact element along said contact path to a predetermined pre-wiped point, and stop means for stopping further rotation of said rotatable member in said one direction upon retraction of said contact element to said pre-wiped point, said rotatable member being rotatable in the reverse direction to reverse the movement of said movable panel means for disengaging the contact sets.

6. A panel assembly according to claim 5 wherein said operating means comprises a linkage mechanism including a first link pivotally connected at a first end to said movable panel means, and a second link rotatable about a first end thereof at a pivot point fixed relative to said fixed panel means, the links being pivotally connected remote from the first ends thereof, the common pivot point of said links being movable in either direction past the line of centers of the pivot points of the first ends thereof.

7. A panel mechanism according to claim 5 wherein said operating means comprises a linkage mechanism including a first link pivotally connected at a first end to said movable panel means, and a second link rotatable about a first end thereof at a pivot point fixed relative to said fixed panel means, the links being pivotally connected remote from the first ends thereof, the common pivot point of said links being movable in either direction past the line of centers of the pivot points of the first ends thereof, one of said links being extended beyond said common pivot point to provide an operating lever for said operating means.

8. A panel assembly according to claim 5 wherein said operating means comprising a crank and connecting link mechanism, the connecting link being pivotally connecting at the driving end thereof to said movable panel means, and said crank being rotatable about a pivot point fixed relative to said fixed panel means.

9. In an interconnecting panel assembly, fixed panel means carrying a first set of contacts each having a contact path, movable panel means carrying a second set of contacts each having a contact element slidably engageable with a contact path, said movable panel means being mounted in said assembly for reciprocating movement relative to said fixed panel means, operating means coupled to said panels for interconnecting the same, said operating means including rotary-to-reciprocating motion transmitting means having a rotatable member operatively coupled to said movable panel means, said member being rotatable in one direction to reciprocate said movable panel means to move each contact element of said second set first toward and into sliding and wiping engagement with the respective contact path of said first set and then to retract said contact element along said contact path to a predetermined pre-wiped point, and stop means for stopping further rotation of said rotatable member in said one direction upon retraction of said contact element to said pre-wiped point.

*10. In an interconnecting panel assembly, a fixed panel carrying a set of spring contacts each having a contact path, a movable panel having spaced holes therein through which are inserted a set of removable plugs each having a contact element with a contact path thereon projecting beyond said movable panel and slidably engageable with the contact paths of said spring contacts, said movable panel being mounted in said assembly for reciprocating movement relative to said fixed panel, operating means coupled to said panels for interconnecting the same, said operating means including rotary-to-reciprocating motion transmitting means including a manually operated, pivotally mounted handle operatively coupled to said movable panel, said handle being rotatable in one direction to reciprocate said movable panel to move each of said contact paths of said contact elements first toward and into sliding and wiping engagement with the respective contact paths of said spring contacts and then to retract said contact elements along said contact paths to predetermined pre-wiped points, and stop means for stopping further rotation of said handle in said one direction upon retraction of said contact elements to said pre-wiped points, said handle being rotatable in the reverse direction to reverse the movement of said movable panel for disengaging said contact members from said spring contacts.*

*11. In an interconnecting panel assembly as set forth in claim 5, said stop means being positioned to limit retraction of said contact element a small distance as compared to the length of wiping engagement, said pre-wiped point being thereby located closely adjacent one end of said contact path.*

*12. In an interconnecting panel assembly as set forth in claim 10, said stop means being positioned to limit retraction of said contact elements a small distance as compared to the length of wiping engagement, said pre-wiped points being thereby located closely adjacent one end of said contact paths.*

*13. In an interconnecting panel assembly as set forth in claim 5, said first set of contacts creating a contact pressures with the said second set of contacts which increases in magnitude as said second set of contacts wipingly engages said first set of contacts and which decreases in magnitude during said retraction to said pre-wiped point, said stop means being positioned to limit retraction of said second set of contacts a small distance as compared to the length of wiping engagement, said pre-wiped point being thereby located closely adjacent one end of said contact path to minimize diminution of the said contact pressure during said retraction.*

*14. In an interconnecting panel assembly as set forth in claim 10, said set of spring contacts creating a contact pressure with the said set of removable plugs which increases in magnitude as said removable plugs wipingly engage said set of spring contacts and which decreases in magnitude during said retraction to said pre-wiped points, said stop means being positioned to limit retraction of said movable plugs a small distance as compared to the length of wiping engagement, said pre-wiped points being thereby located closely adjacent one end of said contact paths to minimize diminution of the said contact pressure during said retraction.*

References Cited

The following references, cited by the Examiner are of record in the patented file of this patient or the original patent.

UNITED STATES PATENTS

| | | | |
|---|---|---|---|
| 1,553,313 | 9/1925 | Goff | 335—126 |
| 2,401,430 | 6/1946 | Lake | 339—18 XR |
| 2,594,737 | 4/1952 | Cunningham | 339—18 |
| 2,594,748 | 4/1952 | Earl | 339—18 |

MARVIN A. CHAMPION, Primary Examiner

P. A. CLIFFORD, Assistant Examiner

U.S. Cl. X.R.

339—95